May 26, 1931.  W. J. HENLEY, JR  1,807,312
CONTINUOUS REVERSIBLE TOASTER
Filed Jan. 10, 1927
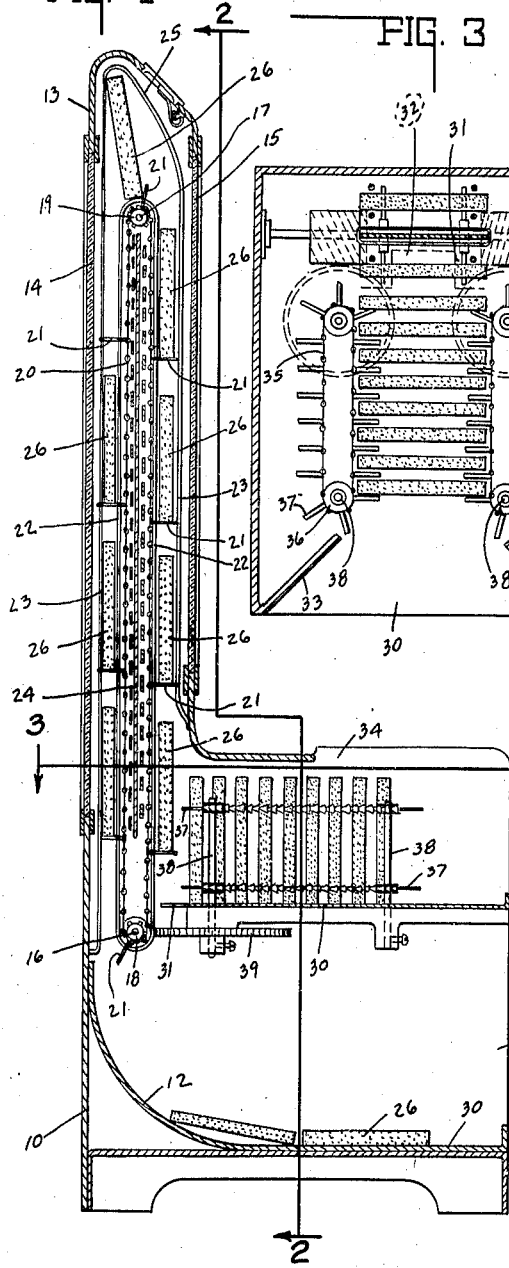
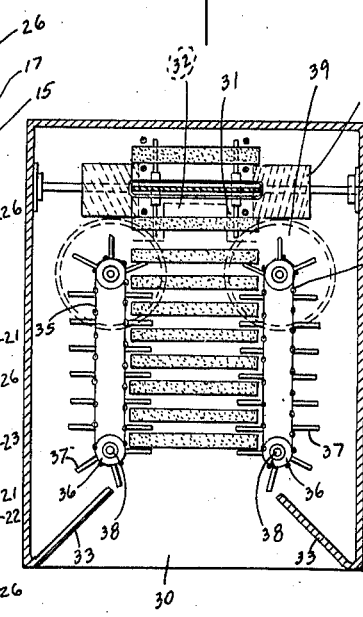
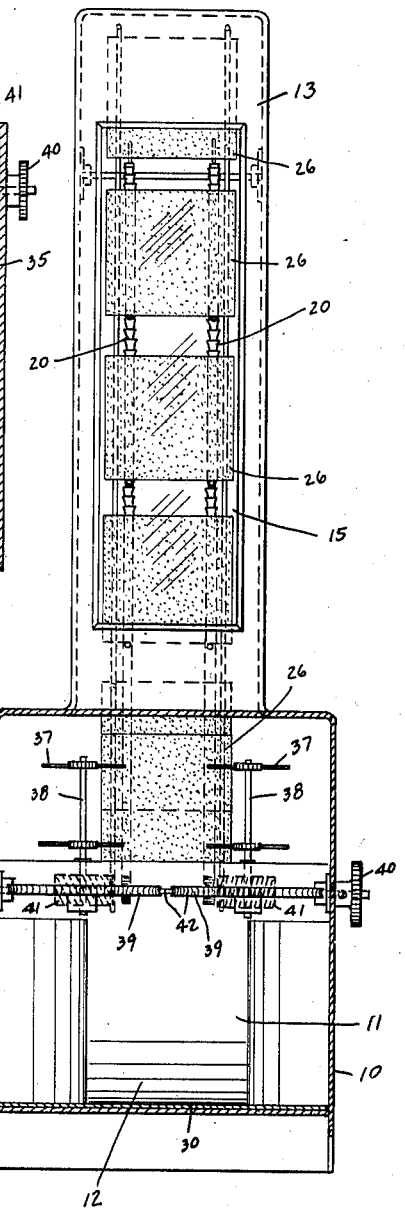
INVENTOR.
WILLIAM J. HENLEY, JR.
BY
ATTORNEYS.

Patented May 26, 1931

1,807,312

UNITED STATES PATENT OFFICE

WILLIAM J. HENLEY, JR., OF RUSHVILLE, INDIANA

CONTINUOUS REVERSIBLE TOASTER

Application filed January 10, 1927. Serial No. 160,147.

This invention relates to a toasting device.

The chief object of this invention is to construct a toaster which is of the continuous type and which is substantially automatic in its operation, to wit, filling and discharging as well as toasting, turning and toasting.

The chief feature of the invention consists in arranging the heating means such that a single heating element is adapted to simultaneously toast opposite sides of bread during the relative movement between the bread and the heating means.

Another feature of the invention consists in the means associated with said heating element for turning the bread to be toasted so as to present a non-toasted surface to the heating means for subsequent toasting.

Another feature of the invention consists in the provision of the automatic discharge and the automatic supply of toasted and non-toasted bread, respectively.

The full nature of the invention will be understood from the accompanying drawings and the following description and claims:

In the drawings Fig. 1 is a central sectional view of one form of the invention. Fig. 2 is a vertical sectional view taken on line 2—2 of Fig. 1 and in the direction of the arrows. Fig. 3 is a transverse sectional view taken on line 3—3 of Fig. 1 and in the direction of the arrows.

In the drawings 10 indicates a framework including an open discharge mouth 11, having an inclined throat 12 leading to a vertical column 13, the front face of which is formed by a transparent member 14 and the rear face of which is formed by a similar member 15, whereby the toasting mechanism and the toast are visible from without. Positioned in the column 13 are a pair of shafts 16 and 17 and mounted thereon are the sprocket wheels 18 and 19, respectively, carrying endless sprocket chains 20. Sprocket chains 20 are provided with transversely or outwardly projecting pairs of pins 21 that are in spaced relation and serve as supports for slices of bread.

Suitably supported adjacent the endless chains 20 are the guide wires or framework 22 upon which the slices of bread or toast bear in their movement through the toaster. Positioned in spaced relation thereto are the guide wires 23, the pairs of wires 22 and 23 forming a channel through which the slices of bread or toast are moved by the endless conveyor.

Positioned within the endless conveyor is a heating element 24 which may be of any desired character and may be suitably controlled such that a piece of bread from the time it is supplied to the endless conveyor until it passes beyond the heating element is sufficiently toasted upon one side. After it is passed beyond the heating element the slice of bread or partially toasted bread is turned and has its opposite face or surface presented to the heating element for final toasting in the return run of the endless conveyor.

Herein the means for securing such turning comprises an elongation of the guide wires 23 at the top and the same is herein indicated by the numeral 25. Said guide wires incline forwardly and thus the action is as follows:

The piece of toast 26 is carried upwardly and has its upper end projected forwardly by riding upon the guide wire portion 25 until the pins supporting the same are substantially at the uppermost part of the travel of the endless conveyor, see Fig. 1. Continued movement of the conveyor then causes the lowermost end of the piece of toast to be moved forwardly or laterally of the conveyor until the supported end clears the pins and falls to rest upon the rear of the next adjacent preceding pair of pins. This operation is automatic and each piece of toast as successively presented follows through this movement. When the supporting pins 21 turn upward in their travel and adjacent the inclined portion 12 the toast is released and slides by gravity down said inclined portion 12 into the hopper or mouth 11 until such time as it is removed by the attendant. Any suitable supplying mechanism may be employed with the foregoing device or the toast may be supplied thereto individually and manually. Herein a suitable device is provided for automatically supplying successive slices of bread for toasting and such feeding mechanism is shown positioned above the discharge mouth 11.

A platform is notched or recessed as at 31 and provides a forwardly projecting tongue 32 that extends between the pins 21 of the endless conveyor and serves as a support for the slice of bread until such time as the pins of the endless conveyor engage the slice bottom and convey the same through the toaster. Adjacent the platform 30 are the side walls 33 and the opening 34 is formed thereby so that the toast may be supplied to the feeding mechanism as desired and the feeding mechanism thereafter will successively supply the slices to the toaster as required.

The feeding mechanism comprises a pair of endless chains 35 having the operating sprockets 36 and including the spacing and conveying pins 37 for pocketing the articles. The sprockets are mounted upon the shafts 38 and said shafts are operable by a worm and worm wheel drive 39 in timed relation with the toasting conveyor. Power is applied to the main drive through the sprocket 40 or other suitable mechanism and from the foregoing it will be apparent that after the main conveyor carries the first slice to be toasted to the heating element successive pieces of bread will be supplied thereto from the filling mechanism previously described and the power for moving the aforesaid in timed relation is obtainable through the shaft 42 driven by sprocket wheel 40. If desired an electric motor may be mounted on the toaster and connected to the shaft 42 for driving the same and said electric motor may be controlled by a main switch which is adapted to simultaneously control the heating element so that when the feeder and toasting conveyor start to move the heating element will be energized and by the time the feeding device has supplied the first piece of bread to the toast conveyor, the heating element will have become sufficiently heated for toasting. By a spline connection between the worm and feeder shaft the spacing of the conveyors may be adjusted if required or desired. While the operation is described as continuous, step by step operation may be employed.

From the foregoing it will be apparent that bread slices may be supplied to the feeding mechanism by vertically positioning a slice in any unoccupied pocket or compartment of the feeding mechanism or by laterally presenting a slice to the opening defined by the guide walls 33. In the latter instance the advancing blades 37 which are moving inwardly towards each other adjacent the ends of the guide walls 33, engage the opening exposed face of the slice and carry the slice forwardly through the feeding mechanism to the toaster.

The invention claimed is:

1. A toaster comprising endless conveyor means, heating means adjacent thereto for a portion thereof, and means in juxtaposition to said conveyor means and intermediate the heated portion thereof for receiving an article from the conveyor means, turning said article to present another side to the heating means and delivering the turned article to the conveyor means for heating the last mentioned side of the turned article.

2. A toaster comprising endless conveyor means, heating means adjacent thereto for a portion thereof, said heating means being positioned between opposed runs of the conveyor means for simultaneously heating said runs, and means in juxtaposition to said conveyor means and intermediate the heated portion thereof for receiving an article from the conveyor means, turning said article to present another side to the heating means and delivering the turned article to the conveyor means for heating the last mentioned side of the turned article.

3. A toaster comprising endless conveyor means, heating means positioned adjacent thereto for heating the article upon one one side when carried by one run of the conveyor means and for heating the opposite side of the article when carried by another run of the conveyor means, and means adjacent the end of the first run of the conveyor means for receiving the article therefrom, turning said article and delivering the turned article to the conveyor means for heating the other side of the article.

4. A toaster comprising endless conveyor means, heating means positioned adjacent thereto and being positioned between opposed runs of the conveyor for simultaneously heating said runs and for heating the article upon one side when carried by one run of the conveyor means and for heating the opposite side of the article when carried by another run of the conveyor means, and means adjacent the end of the first run of the conveyor means for receiving the article therefrom, turning said article and delivering the turned article to the conveyor means for heating the other side of the article.

5. In a toaster, toasting means, mechanism for successively receiving in predetermined isolated relation progressively presented articles and positively conveying the article to and from the toaster for toasting the same, and a feeding device including a plurality of spaced partitions mounted for segregating the article closest to the toaster and place same in path of said mechanism permitting the discharge of but the closest positioned article.

6. In a toaster, toasting means, mechanism for successively receiving in predetermined isolated relation progressively presented articles and conveying the article to and from the toaster for toasting the same, and a feeding device including a plurality of spaced partitions movably mounted for segregating the article closest to the toaster and maintaining the same in position to be engaged by said mechanism while maintaining the remainder of the articles in successive relation.

7. In a toaster, toasting means, mechanism for successively receiving in predetermined isolated relation progressively presented articles and conveying the article to and from the toaster for toasting the same, and a feeding device including a plurality of spaced partitions movably mounted for segregating the article closest to the toaster and maintaining the same in position to be engaged by said mechanism while maintaining the remainder of the articles in successive relation, said device permitting the remainder of the articles to be advanced into successive positions upon discharge of the segregated article.

8. In a toaster, the combination of means providing a heating surface, mechanism for conveying an article thereover for toasting the side closest to the surface, said means having a second heating surface for heating the opposite side of the article when passed thereover, and means for receiving from said conveying means the article after passing over the first heating surface for turning the same and presenting the same to the conveying means for heating the opposite side of the article when passed over the second heating surface.

9. In a toaster the combination of means providing a heating surface, mechanism for conveying an article thereover for toasting the side closest to said surface, said heating means having a second heating surface for heating the opposite side of the article when passed thereover and being formed as a single heating construction, and means for receiving from said conveying means the article after passing over the first heating surface for turning the same and presenting the same to the conveying means for heating the opposite side of the article when passed over the second heating surface.

10. In a toaster the combination of means providing a heating surface, mechanism for conveying an article thereover for toasting the side closest to said surface, said heating means having a second heating surface for heating the opposite side of the article when passed thereover, said conveying mechanism constituting a single endless conveyor for discharging the article after the first side has been toasted and receiving the article after it has been turned, and discharging the same a second time following the toasting of the opposite side of the article.

11. In a toaster the combination of means providing a heating surface, mechanism for conveying an article thereover for toasting the side closest to said surface, said heating means having a second heating surface for heating the opposite side of the article when passed thereover and being formed as a single heating construction, said conveying means constituting a single endless conveyor for discharging the article after the first side has been toasted and receiving the article after it has been turned, and discharging the same a second time following the toasting of the opposite side of the article, and means for receiving from said conveying means the article after passing over the first heating surface for turning the same and presenting the same to the conveying means for heating the opposite side of the article when passed over the second heating surface.

12. In a continuous toasting device including toasting means, the combination of a progressively movable article moving means, and a plurality of pairs of parallel guide wires arranged in channel-forming and spaced relation and in juxtaposition to the toasting means for supporting the weight of the article and confining the movement thereof to a predetermined path adjacent said toasting means, said article moving means being movable between opposed pairs of guide wires for moving the articles thereon.

13. In a toaster, the combination of endless conveyor means, a single heating means positioned adjacent said conveyor means for heating opposite sides of an article conveyed thereby during conveyance and upon opposed runs thereof, intake and discharge means at the same end of the toaster, and means operable in timed relation with said conveyor means for successively supplying the same articles to be toasted.

In witness whereof, I have hereunto affixed my signature.

WILLIAM J. HENLEY, Jr.